(12) United States Patent
Bryant et al.

(10) Patent No.: US 12,042,467 B2
(45) Date of Patent: *Jul. 23, 2024

(54) MEDICAL CONTAINER WITH NFC ANTENNA

(71) Applicant: NOVARTIS AG, Basel (CH)

(72) Inventors: Andrew Bryant, Buggingen (DE); Alain Schmidlin, Saint Louis (FR); Daniel Latham, Allschwil BL (CH); Gabriel Iobbi, Basel (CH); Arun Venkatasubramanian, Arlington, MA (US); Thomas Richard Redman, Waterbeach (GB); Timothy Duncan Wooller, London (GB); Franck Rubiconi, Milton Keynes (GB); Robert George Milner, Cambridgeshire (GB); Richard Andrew Hall, Cambridge (GB); Symon Cotton, Cambridgeshire (GB); Simon Peter Attard, London (GB)

(73) Assignee: Novartis AG, Basel (CH)

( * ) Notice: Subject to any disclaimer, the term of this patent is extended or adjusted under 35 U.S.C. 154(b) by 8 days.

This patent is subject to a terminal disclaimer.

(21) Appl. No.: 17/721,830

(22) Filed: Apr. 15, 2022

(65) Prior Publication Data

US 2022/0257468 A1 Aug. 18, 2022

Related U.S. Application Data

(63) Continuation of application No. 16/078,817, filed as application No. PCT/EP2017/053638 on Feb. 17, 2017, now Pat. No. 11,324,661.

(30) Foreign Application Priority Data

Feb. 25, 2016 (EP) ...................... 16157378

(51) Int. Cl.
*A61J 1/14* (2023.01)
*A61J 1/05* (2006.01)
(Continued)

(52) U.S. Cl.
CPC ............ *A61J 1/1468* (2015.05); *A61J 1/05* (2013.01); *B01L 3/545* (2013.01); *H04B 5/77* (2024.01); *A61J 2205/60* (2013.01)

(58) Field of Classification Search
CPC ........ A61J 2205/60; A61J 1/1468; A61J 1/05; A61J 1/14; A61B 90/98;
(Continued)

(56) References Cited

U.S. PATENT DOCUMENTS

| 4,685,914 A | 8/1987 | Holtman |
| 7,230,521 B2 | 6/2007 | Terenna |

(Continued)

FOREIGN PATENT DOCUMENTS

| CN | 104787443 A | 7/2015 |
| CN | 105292733 A | 2/2016 |

(Continued)

OTHER PUBLICATIONS

Ming et al., "Internet of Things Barcode Technology and RFID Technology," China Materials Publishing Press, May 31, 2011, pp. 164-165.

*Primary Examiner* — Jessica Arble
*Assistant Examiner* — Alessandro R Del Priore
(74) *Attorney, Agent, or Firm* — David Goetz

(57) ABSTRACT

A pharmaceutical container may include a cylindrical hollow container body (100) defining a hollow chamber (111) to receive a pharmaceutical liquid, the container body (100) including a portion on a sidewall (121) of the container body (100), wherein the portion has a longitudinal extension along the longitudinal axis of the container body (100) and (Continued)

Figure 3A:
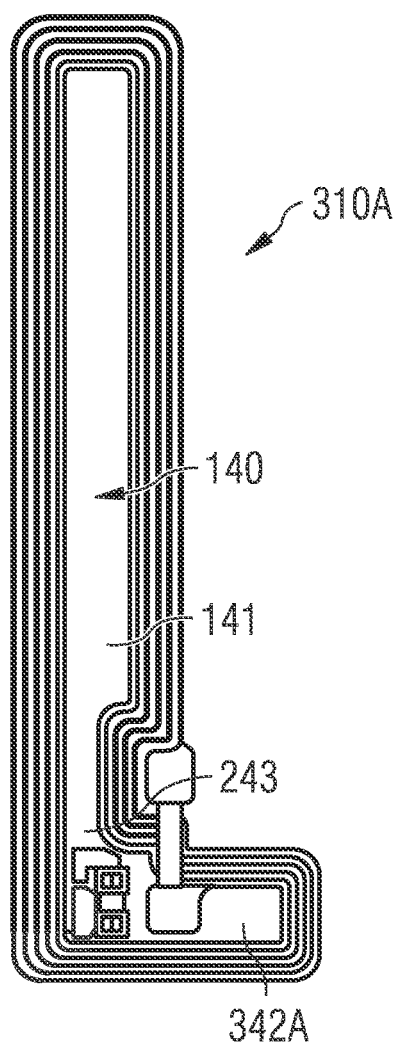

a circumferential extension along the circumference of the container body (100), thereby forming a window (122) through the sidewall (121) of the container body (100) into the hollow chamber (111), the window (122) comprising two long edges (124) and two short edges (125), and a Near Field Communication (NFC) antenna (110) arranged on the outer surface (120) of the sidewall (121) of the container, the antenna (110) including one or a plurality of nested antenna windings (150), each of them surrounding an interior periphery (140) including a substantially longitudinal portion (141) arranged along the two long edges (124) of the window (122), and a substantially circumferential portion (142) arranged mainly around the sidewall (121) of the container body (100) and at least partially along a first one of the two short edges (125) of the window (122) opposite to a second one of the two short edges (125) of the window (122).

20 Claims, 6 Drawing Sheets

(51) Int. Cl.
    *B01L 3/00*      (2006.01)
    *H04B 5/77*      (2024.01)

(58) Field of Classification Search
    CPC ...... A61M 2205/6054; B01L 2300/022; B01L 3/545; B65D 2203/10; H04B 5/0062; G06K 19/07792; G06K 19/07779
    See application file for complete search history.

(56) References Cited

U.S. PATENT DOCUMENTS

| | | | | |
|---|---|---|---|---|
| 7,398,926 B1 * | 7/2008 | Kikin | ...................... | H04B 5/77 235/492 |
| 7,782,212 B2 * | 8/2010 | Burns | ................ | G06K 19/0723 340/10.5 |
| 2004/0100415 A1 | 5/2004 | Veitch et al. | | |
| 2007/0080223 A1 | 4/2007 | Japuntich | | |
| 2007/0146140 A1 | 6/2007 | Nagao et al. | | |
| 2007/0198297 A1 | 8/2007 | Perkins et al. | | |
| 2007/0285246 A1 * | 12/2007 | Koyama | .................. | H02J 50/10 257/E27.111 |
| 2008/0061153 A1 * | 3/2008 | Hickle | ................ | A61M 16/183 235/492 |
| 2009/0289795 A1 | 11/2009 | Yamagajo | | |
| 2013/0264390 A1 * | 10/2013 | Frey | .......................... | C23F 1/02 235/492 |
| 2014/0184390 A1 | 7/2014 | Elizondo, II | | |
| 2014/0262919 A1 * | 9/2014 | Hussain | .................. | A61J 1/035 206/534 |
| 2015/0090625 A1 | 4/2015 | Bauss | | |
| 2015/0307245 A1 * | 10/2015 | Puccini | .................. | G01K 1/022 702/130 |
| 2015/0353234 A1 * | 12/2015 | Yagishita | ............... | B65D 25/02 206/216 |
| 2016/0121527 A1 * | 5/2016 | Eggmann | .......... | B29C 45/14836 425/129.1 |
| 2017/0235919 A1 * | 8/2017 | Bauss | ................. | A61M 5/3157 705/2 |

FOREIGN PATENT DOCUMENTS

| | | | | |
|---|---|---|---|---|
| CN | 206639934 | * | 11/2017 | ............... H01Q 1/24 |
| DE | 102012112297 A1 | | 6/2014 | |
| EP | 1402470 B1 | | 6/2014 | |
| JP | 2005-514965 A | | 5/2005 | |
| JP | 2005058350 A | | 9/2005 | |
| RU | 2546570 C2 | | 4/2015 | |
| WO | 2002/095675 | | 11/2002 | |

\* cited by examiner

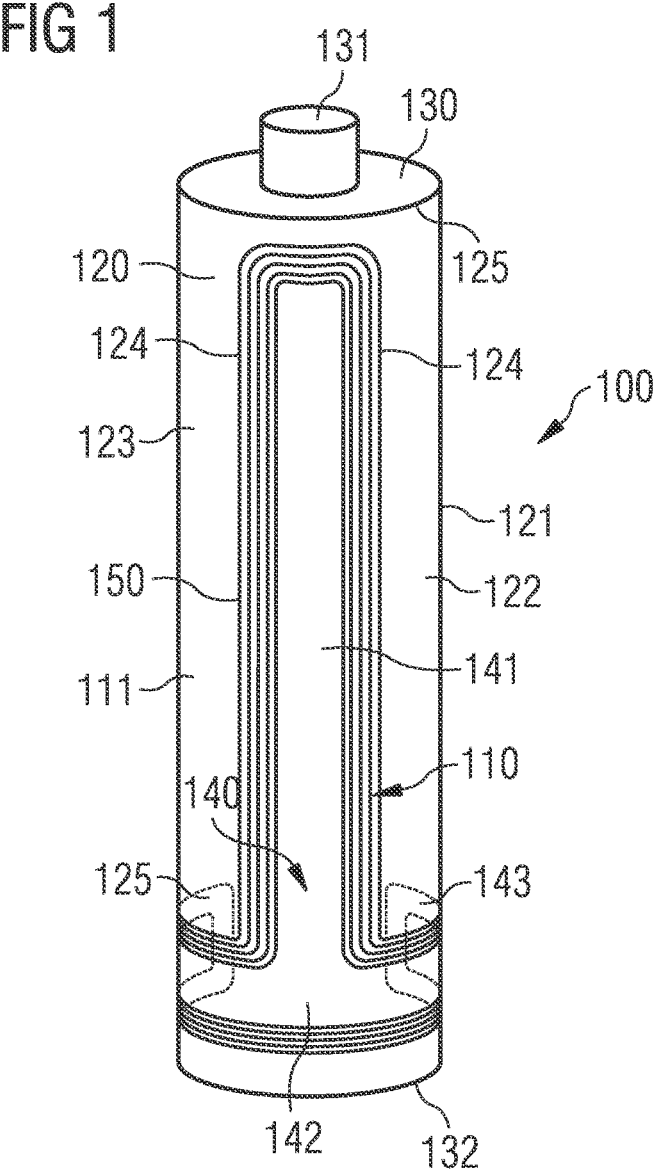

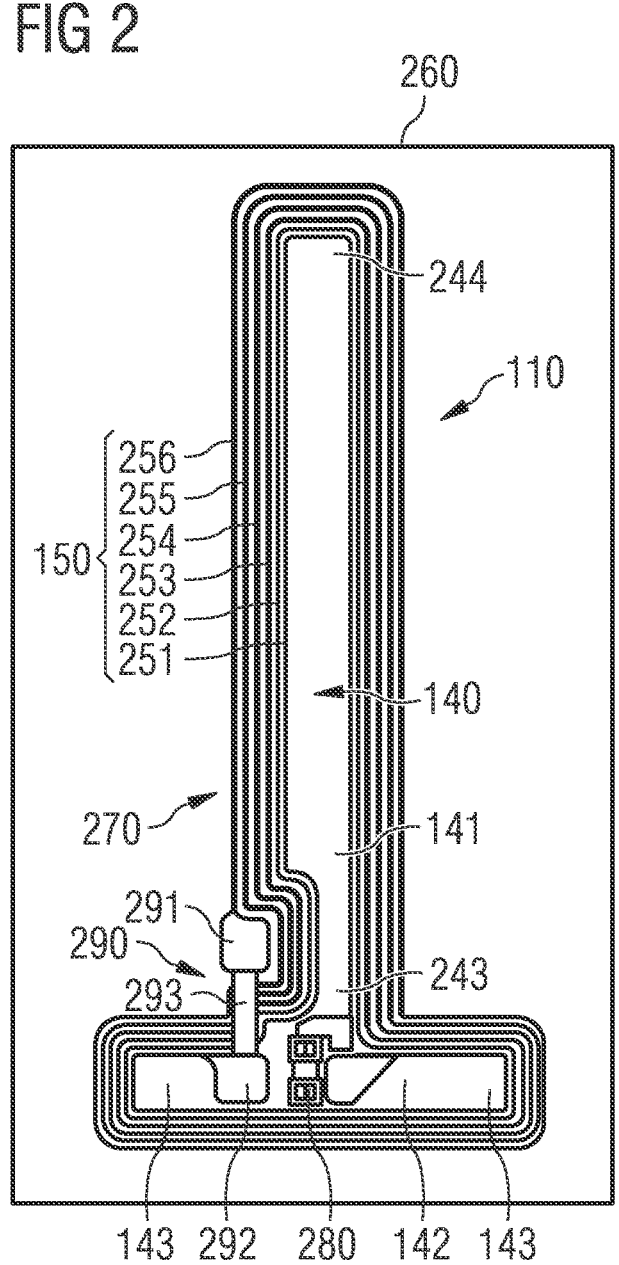

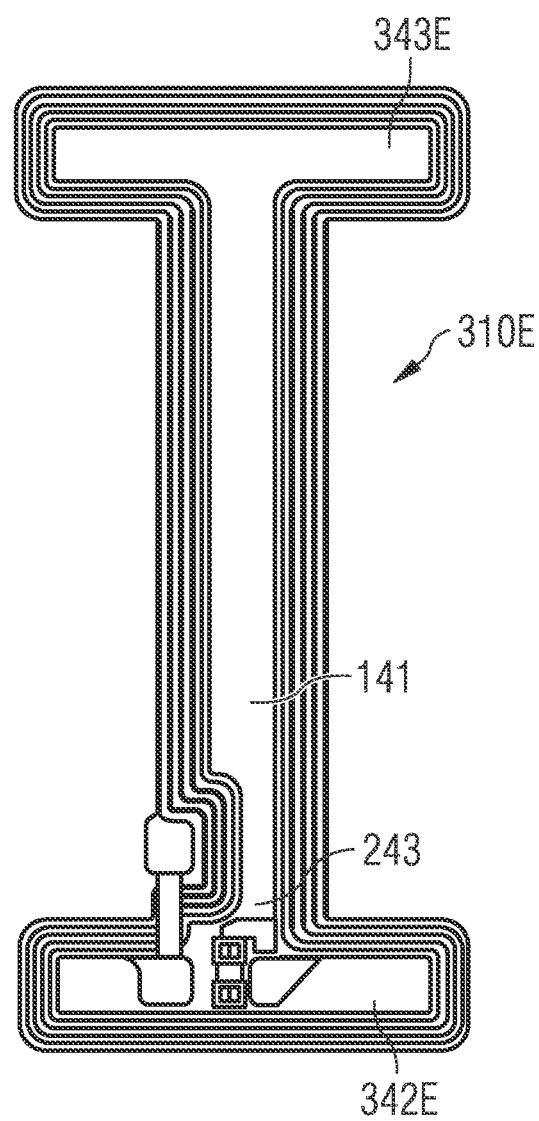

MEDICAL CONTAINER WITH NFC ANTENNA

Various embodiments relate to a contactless automatic authentication of pharmaceutical containers, e.g. to a cylindrical hollow container body being filled with a pharmaceutical liquid.

For contactless authentication the technology of 'Near Field Communication' also called NFC has been proposed. Near Field Communication (NFC) is a short-range wireless communication technology that has been developed for interactive use in consumer electronics, mobile devices and PCs. This technology enables the exchange of data between two devices in close proximity and is an extension of the ISO/IEC 14443 proximity-card standard for 'Radio Frequency identification Devices (RFID)'.

An NFC based communication may be established between two NFC entities, one operating as a contactless tag attached to a product and the other operating as a contactless reader/writer which can be embedded in a stationary or in a mobile device.

EP 1402470 B1 discloses, for instance, an RFID label attached to a medical container, wherein the RFID label includes an integrated circuit placed in the middle of a square shaped antenna. The RFID label has a size of about 21 cm² (1.8×1.8 inch).

Since practice shows in particular with small sized RFID labels that the degree of freedom for positions, in which the communication works properly is limited. The antennas which are used for NFC devices are usually addressing both, performance criteria and also criteria relating to the space occupied by the antenna.

In view of the foregoing it is apparent that there is a need for a pharmaceutical container ensuring a good contactless communication and allowing an unrestricted professional handling with the pharmaceutical container.

Embodiments of the present invention provide a pharmaceutical container solving the above objective.

In an embodiment there is provided a pharmaceutical container. The pharmaceutical container includes a cylindrical hollow container body defining a hollow chamber to receive a pharmaceutical liquid. The cylindrical hollow container body includes a (e.g. transparent) portion on a sidewall of the cylindrical hollow container body, wherein the (e.g. transparent) portion has a longitudinal extension along the longitudinal axis of the cylindrical hollow container body and a circumferential extension along the circumference of the cylindrical hollow container body, thereby forming a window through the sidewall of the cylindrical hollow container body into the hollow chamber. The window includes two long edges and two short edges. A Near Field Communication (NFC) antenna is arranged on the outer surface of the sidewall of the cylindrical hollow container body. The NFC antenna includes one or a plurality of nested antenna windings, each of them surrounding an interior periphery including a substantially longitudinal portion arranged along the two long edges of the window and a substantially circumferential portion arranged mainly around the sidewall of the cylindrical hollow container body and at least partially along a first one of the two short edges of the window opposite to a second one of the two short edges of the window.

The window may be or include a transparent window and the portion may be or include a transparent portion.

In a related embodiment, the substantially circumferential portion has two ends and the substantially longitudinal portion includes a first end) attached to the substantially circumferential portion at one of the two ends) of the substantially circumferential portion or between the two ends of the substantially circumferential portion.

In another related embodiment the pharmaceutical container includes a seal arranged on an upper part of the cylindrical hollow container body, wherein the (e.g. transparent) window extends substantially up to the seal.

In still another related embodiment, the interior periphery includes a further substantially circumferential portion arranged mainly in circumferential direction around the sidewall of the cylindrical hollow container body and at least partially along the second one of the two short edges of the (e.g. transparent) window opposite to the first one of the two short edges of the (e.g. transparent) window.

In yet still another related embodiment, the further substantially circumferential portion has two ends and the substantially longitudinal portion includes a second end attached to the further substantially circumferential portion at one of the two ends or the further substantially circumferential portion or between the two ends of the further substantially circumferential portion.

In still yet another related embodiment, the NFC antenna is deposited on a flexible and transparent substrate being adhesively attached to the sidewall of the cylindrical hollow container body.

In yet another related embodiment, the NFC antenna is connected to an NFC device being arranged within the substantially circumferential portion of the interior periphery.

In yet another related embodiment, the NFC antenna includes a bridging portion including a connection pad disposed in the substantially circumferential portion of the interior periphery.

In yet another related embodiment, the (e.g. transparent) window spans a domain between the two long edges of the (e.g. transparent) window, which has a circumferential extension of at least 50% of the circumference of the cylindrical hollow container body.

In yet another related embodiment, the (e.g. transparent) window has a circumferential extension of at least 66% and preferably of at least 75% of the circumference of the cylindrical hollow container body.

In yet another related embodiment, the plurality of nested antenna windings have a winding width around the substantially circumferential portion, which is basically equal to a width extension of the substantially circumferential portion.

In yet another related embodiment, the plurality of nested antenna windings have a winding width, which is basically the same along the entire circumference of the interior periphery.

Figure 4A:
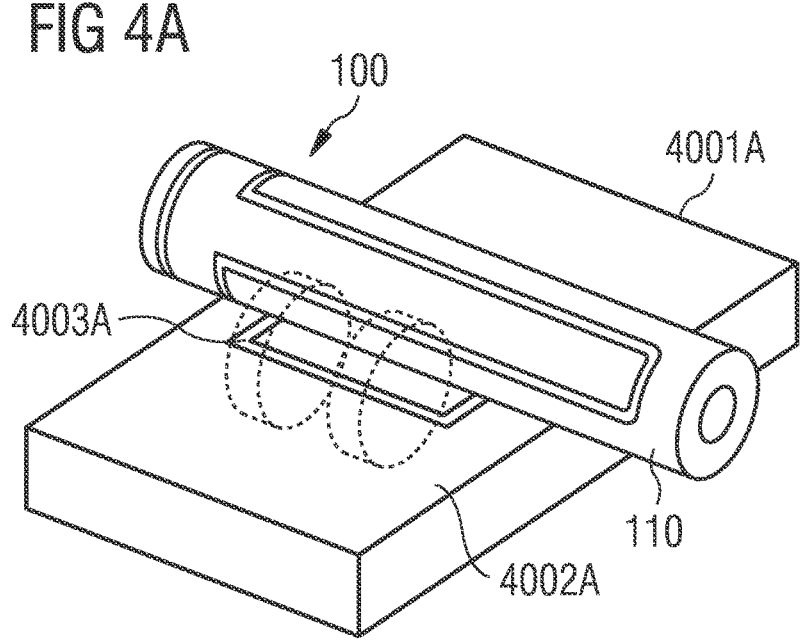
Figure 4B:
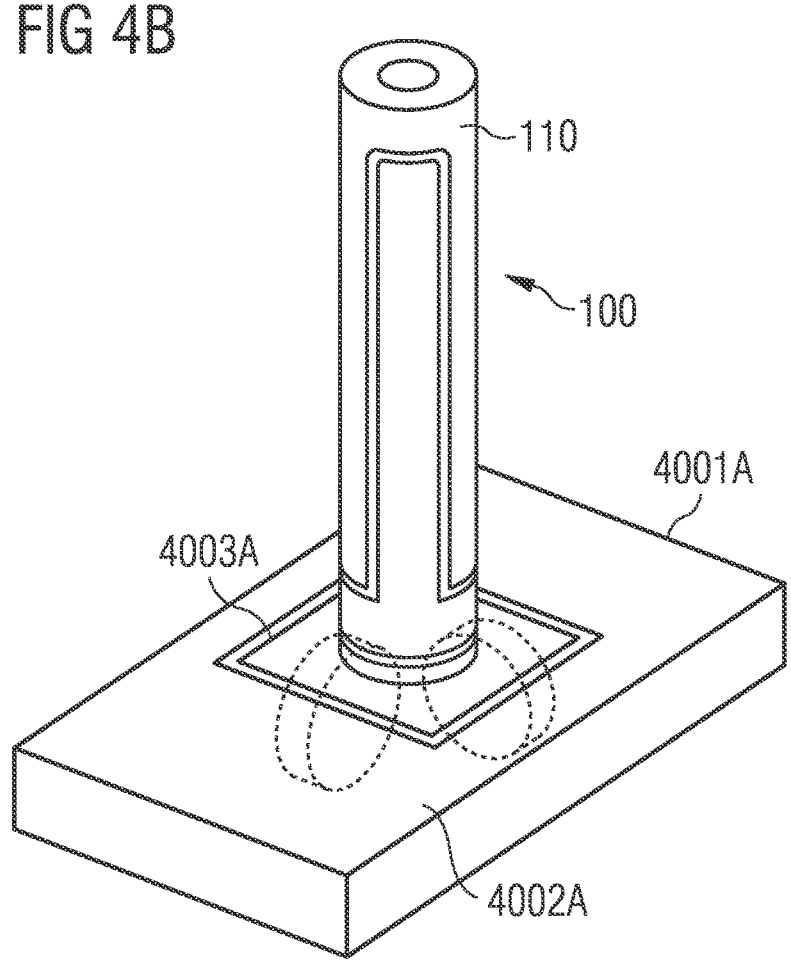

Other aspects, objectives and advantages of the invention or of its embodiments will become apparent on reading the detailed description in conjunction with the following drawings FIG. 1 shows in a schematically illustration a cylindrical hollow container with a Near Field Communication (NFC) antenna;

FIG. 2 shows an exemplary Near Field Communication (NFC) antenna in a view, when deposited on a flat plane;

FIGS. 3A, 3B, 3C, 3D and 3E each show a further exemplary Near Field Communication (NFC) antenna in a view, when deposited on a flat plane;

FIGS. 4A and 4B show schematically illustrated a cylindrical container with a T-shaped antenna in a horizontal position on a NFC read/writer and in a vertical position on a NFC read/writer.

FIG. 1 illustrates in a schematically view a cylindrical hollow container body 100 (in the following denominated as container body 100) with a Near Field Communication (NFC) antenna 110 deposited on an outer surface 120 of a sidewall 121 of the container body 100. The Near Field Communication (NFC) antenna 110 (in the following denominated as NFC antenna 110) is thereby illustrated in a very simplified form with only one winding 150, which represents in a symbolizing manner one or a plurality of windings 150. Moreover, the illustration complies neither with actual magnitudes, nor with actual proportions.

The container body 100 includes a hollow chamber 111 to receive a pharmaceutical liquid (not shown). The container body 100 is made of a transparent and substantially clear pharmaceutical grade glass, e.g. borosilicate glass, or of a transparent and substantially clear pharmaceutical grade plastics, e.g. cyclic olefin copolymers, polycarbonate or polypropylene.

The container body 100 therewith includes a transparent sidewall 121, having an outer surface 120, which is partially covered by the NFC antenna 110. Further, the container body 100 includes an upper part 130 with a seal 131 and includes a bottom part 132.

The NFC antenna 110 is composed of one winding or of a plurality of windings 150 (only one of them as a symbolizing representative shown) surrounding an interior periphery 140 (shown shaded), which is composed of a substantially longitudinal portion 141 and a substantially circumferential portion 142.

The substantially longitudinal portion 141 (in the following denominated as longitudinal portion 141) of the interior periphery 140 has a longitudinal extension, which is oriented in a direction of a longitudinal extension of the container body 100. The direction of the longitudinal extension of the container body 100 complies with the direction of the cylinder axis (not shown) of the container body 100.

The substantially circumferential portion 142 (in the following denominated as circumferential portion 142) of the interior periphery 140 includes two ends 143 and is attached to one end of the longitudinal portion 141. The circumferential portion 142 extends basically circumferentially around the circumference of the container body 100. The circumferential portion 142 of the interior periphery 140 is embracing the container body 100 only to a non-full extend, therewith avoiding an overlap of the windings 150 where the two ends 143 of the circumferential portion 142 converge each other.

The circumferential portion 142 extends in a plane, which is oriented perpendicular to the cylinder axis. In the shown embodiment (FIG. 1) of the NFC antenna 110 the longitudinal portion 141 is attached to the circumferential portion 142 at the middle between the two ends 143 of the circumferential portion 142.

The circumferential portion 142 has a width extension in the direction of the cylinder axis.

The plurality of windings 150, which are tightly surrounding the interior periphery 140 are reduced in transparency or non-transparent, whereas the interior periphery 140 may be transparent, reduced transparent or non-transparent.

With the NFC antenna 110 partially covering the outer surface 120 of the sidewall 121 of the container body 100 a transparent portion 123 of the sidewall 121 of the container body 100 is defined by an area not being covered from the plurality of windings 150 or from the interior periphery 140. The transparent portion 123 has a longitudinal extension along the longitudinal axis of the container body 100 and a circumferential extension along the circumference of the container body 100. The transparent portion 123 therewith defines a transparent window 122 through the sidewall 121 of the container body 100 into its hollow chamber 111.

Through the transparent window 122 the pharmaceutical liquid inside the hollow chamber 111, in particular a filling level of the pharmaceutical liquid is easily visible and observable. The transparent window 122 can be regarded as defined by two long edges 124 both extending in a direction of the cylinder axis and two short edges 125, extending circumferentially in parallel. A first one of the two short edges 125 is extending near the circumferential portion 142 of the interior periphery 140 and a second one is extending near the upper part 130 of the container body 100.

The NFC antenna 110 is usually deposited on a flexible and transparent substrate (not shown), which is adhesively attached to the outer surface 120 of the sidewall 121 of the container body 100. The flexible and transparent substrate (not shown) constitutes together with the NFC antenna 110 and an NFC device (not shown) an NFC entity, which is operating as a contactless tag attached to the container body 100.

An NFC antenna 110, which is configured and attached as described above allows a large contiguous area of the sidewall 121 of the container body 100 to be maintained transparent. Solely the relatively small area covered by the interior periphery 140 and the plurality of windings 150 surrounding the longitudinal portion 141 and the circumferential portion 142 of the interior periphery 140 of the NFC antenna 110 prevents the sidewall 121 from being all over transparent.

Moreover, the longitudinal portion 141 and the plurality of windings 150 surrounding the longitudinal portion 141 along its longitudinal extension may only cover a sector of smaller than 180 degrees with respect to the cylinder axis, preferably smaller than 120 degrees, more preferably smaller than 90 degrees and even more preferably between 60 and 90 degrees.

In other words, with a coverage smaller than 180 degrees, the transparent window 122 has a circumferential extension of at least 50% of the circumference of the container body 100. Accordingly, with a coverage of smaller than 120 degrees, the transparent window 122 has a circumferential extension of at least 66% of the circumference of the container body 100, and with a coverage of smaller than 90 degrees, the transparent window 122 has a circumferential extension of at least 75% of the circumference of the container body 100.

A covered sector below 180 degrees generates a non-covered sector that allows a transparency through the container body 100, i.e. through both diametrically opposed parts of the side wall 121. Such transparency through the container body 100 facilitates observing and reading of a filling level of a pharmaceutical liquid inside the container body 100.

Having the circumferential portion 142 arranged near the bottom part 132 of the container body 100, the observability of a filling level can be facilitated, when the container body 100 is, for instance, pharmaceutical vial from which the pharmaceutical liquid is withdrawn by suction through the seal 353 via a syringe (not shown). For this purpose the container body 100 is namely held upside down, which turns an air cushion in the hollow chamber 111 of the container body 100 to the bottom part 132 of the container body 100, where it does not harm, when transparency is not or not fully provided due to the NFC antenna 100.

FIG. 2 illustrates in more details the embodiment of a NFC antenna as described and shown in connection with the previous figures.

The illustration and description refers to a shape, which NFC antenna 110 takes, when enrolled on a flat plane surface. The illustration complies neither with actual magnitudes, nor with actual proportions.

The NFC antenna 110 shown includes a conductor, which is wound in a configuration of a plurality of nested windings 150, e.g. six windings 251, . . . , 256 around an interior periphery 140 having a shape that can be regarded as a T-shape turned upside down.

An inner winding 251, four further windings 252, . . . , 255 and an outermost winding 256 are arranged on a common surface, which is provided by a transparent flexible substrate 260. The common surface is usually of a flat plane when the NFC antenna 110 is deposited on the substrate 260 as fabricated. The deposition of the NFC antenna 110 onto the substrate 260 can be realized for instance by printing of the conductor onto the surface of the substrate 260.

The plurality of nested windings 150, e.g. six windings 251, . . . , 256, of the conductor are largely aligned in parallel to each other throughout their entire circumference. Each winding of the six nested windings 251, . . . , 256 has a conductor width and an inter-winding distance to the conductor of an adjacent one of the plurality of windings 150.

A winding width is composed of the conductor widths and the inter-winding distances from the inner winding 251 to the outermost winding 256, with the inner winding 251 and the outermost winding 256 being included.

When being precise two winding sections can be distinguished, (one around the longitudinal portion 141 and another around the circumferential portion 142) with each winding section having a winding width slightly different to the other. Nevertheless in the shown embodiment of an NFC antenna 110, the winding width of the plurality of nested windings 150 along the entire circumference of the interior periphery 140 can be considered as being basically the same. Moreover, the width extension of the circumferential portion 142 may be basically equal to the winding width.

Hence, the shape of the NFC antenna 110 can be defined by the interior periphery 140 tightly surrounded by the inner winding 251. Consequently, the shape of the NFC antenna 110 can be regarded according to the shape of its interior periphery 140 as a T-shape turned upside down.

The interior periphery 140 is composed of a substantially circumferential portion 142 (in the following denominated as circumferential portion 142), which is defining two legs projecting in opposite directions, and a substantially longitudinal portion 141 (in the following denominated as longitudinal portion 141). The longitudinal portion 141 having a first end 243, which is attached to the circumferential portion 142, and a second end 244.

The longitudinal portion 141 with its longitudinal extension is oriented perpendicular to the opposing directions of the projecting legs of the circumferential portion 142. Therewith the interior periphery 140 of the shown embodiment of an NFC antenna 210 has a symmetry axis (not shown) extending in the direction of a longitudinal extension of the longitudinal portion 141.

An exterior periphery 270 of the shown NFC antenna 110 is defined by the outermost winding 256.

Further, the illustrated embodiment of an NFC antenna 110 includes an NFC device 280, which is deposited together with the NFC antenna 110 on the substrate 260 and is disposed in the circumferential portion 142 of the interior periphery 140. The NFC device 280 includes a memory circuit and an interface circuit (both not shown) and is electrically looped in the inner winding 251 with two connection pads connected to different ends of the inner winding 251.

Further, the illustrated embodiment of an NFC antenna 110 includes a bridging portion 290, which is electrically connecting the inner winding 251 to the outermost winding 256.

The bridging portion 290 includes a first connection pad 291 disposed in the proximity of the first end 243 of the longitudinal portion 141 at the exterior periphery 270 and being connected to a first end of the conductor disposed at the outermost winding 256. The bridging portion 290 further includes a second connection pad 292, which is disposed in the circumferential portion 142 of the interior periphery 140 and is connected to a second end of the conductor disposed at the inner winding 251.

The first and second connection pads 291, 292 are aligned with respect to each other in the direction of the longitudinal extension of the NFC antenna 110. The inner windings, e.g. five windings 251, . . . , 255, with respect to the outermost winding 256 sidestep the first connection pad 291, therewith locally narrowing the interior periphery 140 in the proximity of the first connection pad 291, but maintaining the lateral extension of the exterior periphery 270 of the NFC antenna 210 along the longitudinal portion 141 substantially constant.

A straight bridging element 293 is electrically connecting the first and second connection pads 291, 292, while being electrically insolated by a non-conductive layer (not shown) to the windings being bridged.

Alternatively the bridging portion 290 may be arranged on any other location across the plurality of windings 150. A preferable position may be for instance at an end of one of the two legs of the circumferential portion 142. In such an arrangement the first and second connection pads may be aligned with respect to each other in the direction of the longitudinal extension of the circumferential portion 142, such that a first connection pad is arranged in the circumferential portion 142 of the interior periphery and a second connection pad is arranged in the exterior periphery 270.

With the bridging portion 290 it is ensured that the conductor of the antenna 110 forms a closed loop, in which the NFC device 280 electrically looped into. Therewith, the NFC antenna 110 with the NFC device 280 connected thereto, and both deposited on a substrate 260 are constituting a NFC entity, operating as a contactless tag.

With regard to exemplary dimensional characteristics of the NFC antenna 110, in various embodiments the NFC antenna 110 has a longitudinal extension of the exterior periphery 270, which is oriented in the direction of the longitudinal extension of the longitudinal portion 141, in total of about 55 mm, whereby a section of the exterior periphery 270 related to the longitudinal portion 141 contributes with about 50 mm. The exterior periphery 270 at the longitudinal portion 141 of the antenna 110 has a lateral extension of about 7 mm and the exterior periphery 270 at the circumferential portion 142 of the antenna 110 has a lateral extension of about 21 mm. An NFC antenna 110 with the above dimensions may be applied on a vial having, for instance, 3 ml volume.

In various embodiments, the antenna 110 has longitudinal extension of the exterior periphery 270, in total of about 40 mm, whereby a section related to the longitudinal portion 141 contributes with about 34 mm. The exterior periphery 270 at the longitudinal portion 141 of the NFC antenna 110 has a lateral extension of about 14 mm and the exterior periphery 270 as the circumferential portion 142 has a lateral extension of about 40 mm. An NFC antenna 110 with the above dimensions may be applied on a vial having, for instance, 10 ml volume.

In various embodiments, the antenna 110 has a longitudinal extension of the exterior periphery 270, in total of about 37 mm, whereby a section related to the longitudinal portion 141 contributes with about 31 mm. The exterior periphery 270 at the longitudinal portion 141 of the antenna 110 has a lateral extension of about 6 mm and the exterior periphery 270 at the circumferential portion 142 has a lateral extension of about 17 mm. An NFC antenna 110 with the above dimensions may be applied on a vial having, for instance, 1 ml volume.

The NFC antennas 110 with characteristics of one of the above embodiments exhibit performance allowing a read distance up to 15 mm, when attached to a container body 100, such as described in connection with FIG. 1.

FIG. 3A illustrates a further embodiment of an NFC antenna (in the following denominated as NFC antenna 310A). The NFC antenna 310A includes a conductor, which is wound in a configuration of plurality of nested windings, e.g. six windings, around an interior periphery 140 having a shape that can be regarded as an L-shape.

The illustration complies neither with the actual magnitudes, nor with the actual proportions.

Since the NFC antenna 310A deviates from the NFC antenna 110 as described above, only with respect to its different shape, a description of its construction, its characteristics and in particular with respect to the composition of windings will be omitted to avoid repetition.

The NFC antenna 310A includes the interior periphery 140, which is composed of a substantially circumferential portion 342A (in the following denominated as circumferential portion 342A) defining only one projecting leg in a lateral direction and a substantially longitudinal portion 141 (in the following denominated as longitudinal portion 141), which has a first end 243 attached to one of the two ends of the circumferential portion 342A.

The longitudinal portion 141 with its longitudinal extension is oriented perpendicular to the lateral direction of the projecting leg of the circumferential portion 342A.

Figure 3B:
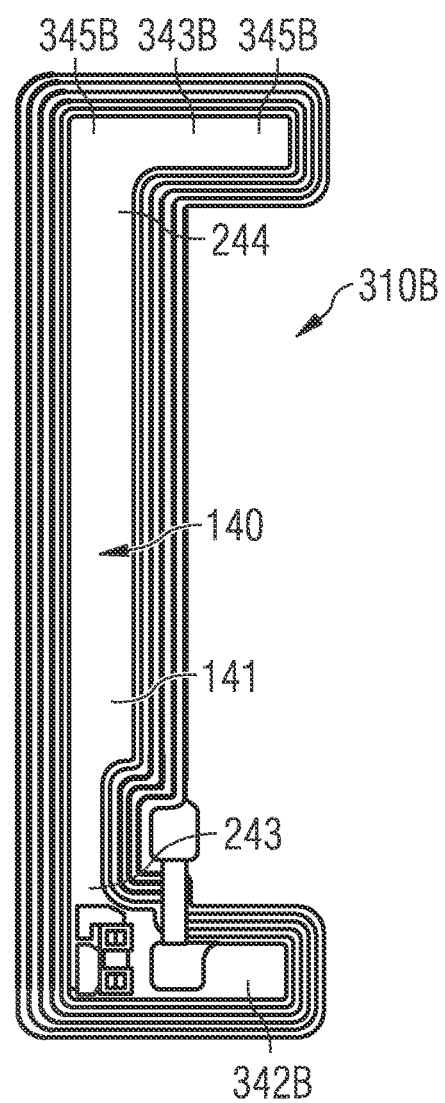

FIG. 3B illustrates a further embodiment of an NFC antenna (in the following denominated as NFC antenna 310B). The antenna 310B includes a conductor, which is wound in a configuration of a plurality of nested windings, e.g. six windings, around the interior periphery 140 having a shape that can be regarded as a C-shape.

The illustration complies neither with the actual magnitudes, nor with the actual proportions.

Since the NFC antenna 310B deviates from the NFC antenna 110 as described above, only with respect to its different shape, a description of its construction, its characteristics and in particular with respect to the composition of windings will be omitted to avoid repetition.

The NFC antenna 310B includes the in periphery 140, which is composed of a substantially circumferential portion (in the following denominated as circumferential portion 342B) defining only one projecting leg in a lateral direction, a substantially longitudinal portion 141 (in the following denominated as longitudinal portion 141). The longitudinal portion 141 has a first end 243 attached to the circumferential portion 342B and a second end 244 attached to a further substantially circumferential portion 343B defining only one leg projecting in a horizontal direction equal to that of the projecting leg of the circumferential portion 342B. The further substantially circumferential portion 343B has two ends 345B, one of which is attached to the second end 244 of the longitudinal portion 141.

The longitudinal portion 141 with its longitudinal extension is oriented perpendicular to the lateral direction of the projecting legs of the circumferential portion 342B and the further substantially circumferential portion 343B.

Figure 3C:
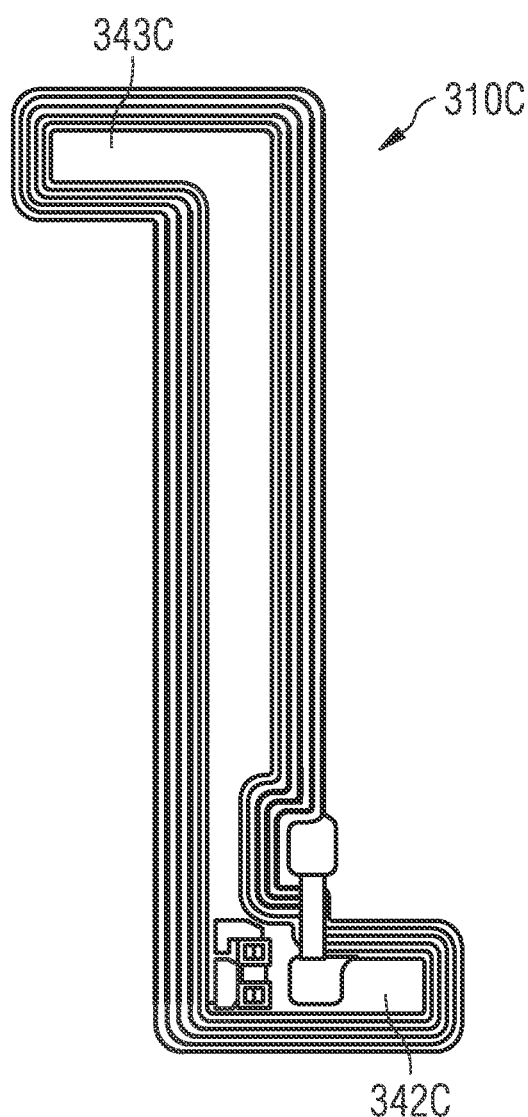

FIG. 3C illustrates a further embodiment of an NFC antenna (in the following denominated as NFC antenna 310C). The illustration complies neither with the actual magnitudes, nor with the actual proportions.

The NFC antenna 310C complies with the NFC antenna 310B shown in FIG. 3B with the sole deviation that the further substantially circumferential portion 343C defines one leg projecting in a lateral direction opposite to that of the projecting leg of the circumferential portion 342B, 342C.

Figure 3D:
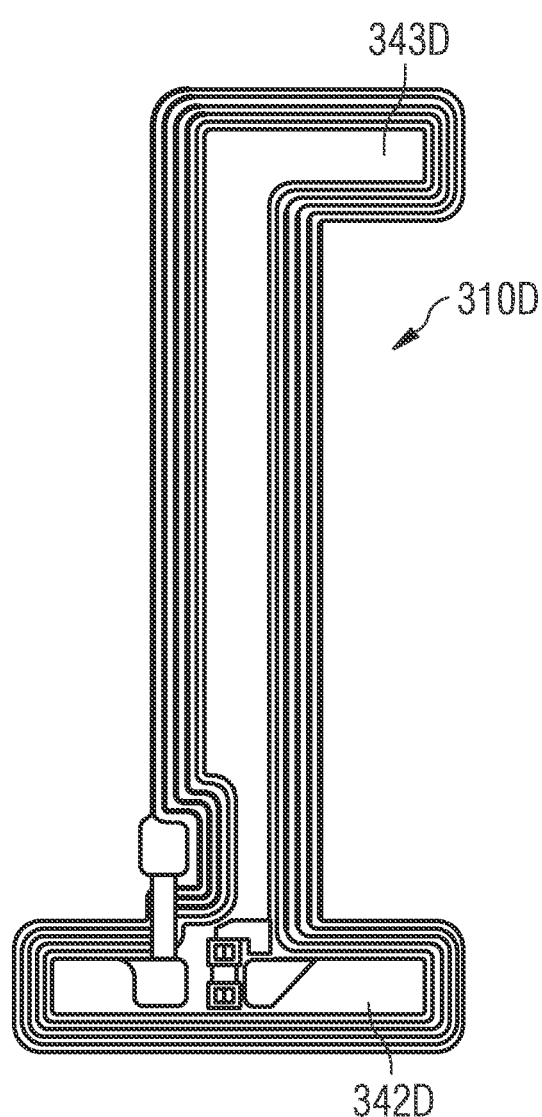

FIG. 3D illustrates a further embodiment of an NFC antenna (in the following denominated as NFC antenna 310D). The illustration complies neither with the actual magnitudes, nor with the actual proportions.

The NFC antenna 310D complies with the NFC antenna 310C shown in FIG. 3C with the sole deviation that the substantially circumferential portion 342D defines two legs projecting in opposite directions. Such an embodiment of a substantially circumferential portion 342D has been already described above and is shown in FIG. 2.

FIG. 3E illustrates a further embodiment of an NFC antenna (in the following denominated as NFC antenna 310E). The illustration complies neither with the actual magnitudes, nor with the actual proportions.

The NFC antenna 310E complies with the NFC antenna 310D shown in FIG. 3D with the sole deviation, that the further substantially circumferential portion 343E defines two legs projecting in opposite directions. The further substantially circumferential portion 343E is therewith shaped and oriented like the substantially circumferential portion 342E, which is attached to the first end 243 of the longitudinal portion 141.

FIG. 4A illustrates in a schematically view a container body 100 with a NFC antenna 110, as described above in connection with FIG. 1 and FIG. 2. The container body 100 stands for any type of container and the T-shaped NFC antenna 110 deposited on the container body 100 stands merely as an example for any shape of NFC antennas as disclosed above. Moreover the illustration complies neither with actual magnitudes, nor with actual proportions.

The container body 100 is positioned in a horizontal orientation on a NFC reader/writer 4001A. The NFC reader/writer 4001A is equipped with a plane cover surface 4002A, which includes a rectangular antenna 4003A being a component of a NFC-entity, operating as a reader/writer. The rectangular antenna 4003A is configured of multiple windings (only two of them are shown) wound around a rectangular interior periphery.

Although the windings of the rectangular antenna 4003A are not visible in practice they have been made visible for illustration purposes.

The same applies to the multiple windings (only two of them are shown) of the T-shaped NFC antenna 110, which are usually not visible, but have been made visible for illustration purposes.

A relatively small current sent through the conductor forming the windings 4003A or the NFC reader writer 4001A, will generate a magnetic field around the conductor. The magnetic field symbolized by two dotted cylinders taking the conductor as their cylinder axis. Although the magnetic field is only symbolized at one side of the rectangular antenna 4003A, it extends in reality along all four sides of the rectangular antenna 4003A.

The magnetic field catches and embraces the conductor at the substantially longitudinal portion of the T-shaped NFC antenna 110 attached to the container body 100. This induces a current in the conductor of the T-shaped NFC antenna 110, which supplies the NFC device (not shown) of the NFC entity (not shown) attached to the container body 100. Therewith the basis for a communication between the NFC entity of the reader/writer 4001A and the NFC entity of the container body 100 is created.

Although the T-shaped NFC antenna 110 is shown as being oriented in parallel with its substantially longitudinal portion to one of the sides of the rectangular antenna 4003A of the reader/writer 4001A, the container body 100 can be oriented in either horizontal position on the reader/writer 4001A, while the T-shaped NFC antenna 110 ensures that enough current is induced and a communication between the two NFC entities can established. This also applies to any rotational position of the container body 100.

FIG. 4B illustrates in a schematically view a container body 100 with a NFC antenna 110, as described above in connection with FIG. 1 and FIG. 2. The container body 100 stands for any type of container and the T-shaped NFC antenna 110 as shown on the container body 100 stands merely as an example for any shape of a NFC antenna 110 configured as described above. Moreover the illustration complies neither with actual magnitudes, nor with actual proportions.

The container body 100 is positioned in a vertical orientation on a NFC reader/writer 4001A. The NFC reader/writer 4001A may be identical so that described above in connection with the previous figure. The container body 100 may be also identical to that described above together with the previous figure. Description of further details have been omitted therefore to avoid repetition.

As described in connection with the previous figure a relatively small current sent through the conductor forming the windings of the NFC reader writer 4001A, will generate a magnetic field around the conductor. The magnetic field is symbolized by two dotted cylinders taking the conductor as their cylinder axis. Although the magnetic field is only symbolized at two sides of the rectangular antenna 4003A, it extends along all four sides of the rectangular antenna 4003A.

The magnetic field catches and embraces the conductor at the circumferential portion, in particular at the projecting legs of the circumferential portion of the T-shaped antenna 110 attached to the container body 100. This induces a current in the conductor of the T-shaped NFC antenna 110 as already described above in connection with the previous figure.

The container body 100 can be rotated in either rotational position on the reader/writer 4001A, while the T-shaped NFC antenna 110 ensures that enough current is induced and a communication between the two NFC entities can be established and maintained.

Therewith the container body 100 with the T-shaped NFC antenna 110 attached thereto can be placed in any horizontally or upright vertically position and in any rotational position, while the communication is ensured. This attitude tremendously facilitates the reading/writing procedure not only when performed manually but also when performed automatically by the aid of a conveyor, which transports container bodies 100 one after the other over the reader/writer 4001A. In such an environment no malfunction would be alerted, if a container body 100 inadvertently leaves its predetermined orientation, e.g. turns over.

A further degree of freedom, which allows also a communication when the container body 100 is positioned vertically upside down, can be achieved with an antenna that includes a substantially circumferential portion at each end of the substantially longitudinal portion, for instance a NFC antenna as described together with FIGS. 3B to 3E.

A medical or pharmaceutical container bearing an NFC entity equipped with an NFC antenna configured according to one of the above embodiments can automatically or manually individualized at the manufacturing site by writing product relevant information such as the product type, date of production, storage life, site of production etc. in the NFC device. At the pharmacy this information can be read and verified for instance with respect to the storage life. Further information can be added by writing into the NFC entity, for instance, the data of emittance from storage, the patient's name, etc.

The invention claimed is:

1. A method of authenticating a container, the method comprising:
providing a container defining a hollow chamber, the container comprising a sidewall having a circumference and extending circumferentially around the container, and wherein the container further comprises a Near Field Communication antenna on the sidewall, the Near Field Communication antenna comprising one or more antenna windings, the antenna windings surrounding an interior space defined by the antenna windings, the interior space comprising a longitudinally extending portion and a circumferentially extending portion, wherein the longitudinally extending portion covers less than 180 degrees of the circumference of the sidewall;
writing a first set of information into the Near Field Communication antenna; and
communicating the first set of information to a Near Field Communication reader.

2. A method according to claim 1 wherein the container is cylindrical.

3. A method according to claim 1 wherein the Near Field Communication antenna is installed on an outer surface of the sidewall.

4. A method according to claim 1 wherein the sidewall is at least partially transparent to allow visualization of contents within the hollow chamber.

5. A method according to claim 1 wherein the longitudinally extending portion of the interior space has two ends and wherein one end of the longitudinally extending portion is attached to the circumferentially extending portion.

6. A method according to claim 1 wherein the method further comprises:
filling the hollow chamber with contents comprising a pharmaceutical, and
sealing the container at a seal,
wherein the seal is arranged on an upper part of the container, and wherein the sidewall extends substantially to the seal.

7. A method according to claim 1 wherein the circumferentially extending portion extends circumferentially around the container to a non-full extent.

8. A method according to claim 1 where the interior space comprises a second circumferentially extending portion separated from the first circumferentially extending portion and wherein the longitudinally extending portion comprises a first end attached to the first circumferentially extending portion and a second end attached to the second circumferentially extending.

9. A method according to claim 1 wherein the longitudinally extending portion of the interior space covers less than 120 degrees of the circumference of the sidewall.

10. A method according to claim 1 wherein the longitudinally extending portion of the interior space covers from 60 degrees to 90 degrees of the circumference of the sidewall.

11. A method according to claim 1 wherein the first set of information comprises one or more of a product type, a date of production, a storage life, and a site of production.

12. A method according to claim 1 wherein the method further comprises writing a second set of information into the Near Field Communication antenna after the communication of the first set of information to the Near Field Communication reader.

13. A method according to claim 12 wherein the second set of information comprises one or more of patient information and a date of admittance.

14. A method according to claim 1 wherein the Near Field Communication reader is at a pharmacy.

15. A method of authenticating a pharmaceutical container, the method comprising:
  providing a container defining a hollow chamber, the container comprising a sidewall having a circumference and extending circumferentially around the container, and wherein the container further comprises a Near Field Communication antenna on the sidewall, the Near Field Communication antenna comprising one or more antenna windings, the antenna windings surrounding an interior space defined by the antenna windings, the interior space comprising a longitudinally extending portion and a circumferentially extending portion, wherein longitudinally extending portion covers less of the circumference of the sidewall than the circumferentially extending portion;
  writing product information into the Near Field Communication antenna; and
  communicating the product information to a Near Field Communication reader.

16. A method according to claim 15 wherein the product information comprises one or more of product type, date of production, storage life, and site of production.

17. A method according to claim 15 wherein the method further comprises writing additional information into the Near Field Communication antenna after the communication of product information to the Near Field Communication reader, wherein
  the additional information comprises one or more of patient information and date of emittance.

18. A method of authenticating a pharmaceutical container, the method comprising:
  providing a container defining a hollow chamber, the container comprising at least partially transparent sidewall having a circumference and extending circumferentially around the container, and wherein the container further comprises a Near Field Communication antenna on the sidewall, the Near Field Communication antenna comprising one or more antenna windings, the antenna windings surrounding an interior space defined by the antenna windings, the interior space comprising a longitudinally extending portion that covers less than 180 degrees of the circumference of the sidewall to create a transparent portion of the circumference at the location of the longitudinally extending portion,
  writing product information into the Near Field Communication antenna;
  transporting the pharmaceutical container to a pharmacy; and
  communicating the product information to a Near Field Communication reader at the pharmacy,
  wherein the transparent portion allows the fill level of the pharmaceutical to be visualized in the portion of the longitudinally extending portion.

19. A method according to claim 18 wherein the method further comprises writing additional information into the Near Field Communication antenna after the communication of product information to the Near Field Communication reader, wherein
  the additional information comprises one or more of patient information and date of emittance.

20. A method according to claim 18 wherein the interior space further comprises a circumferentially extending portion and wherein the longitudinally extending portion of the interior space has two ends and wherein one end of the longitudinally extending portion is attached to the circumferentially extending portion.

\* \* \* \* \*